United States Patent

Anstey

[15] 3,676,841
[45] July 11, 1972

[54] SEISMIC PROSPECTING WITH A CONTINUOUS SEISMIC SOURCE

[72] Inventor: Nigel Allister Anstey, 12, Percival Road, Orpington, Kent, England

[22] Filed: Sept. 11, 1969

[21] Appl. No.: 857,123

[30] Foreign Application Priority Data

Sept. 13, 1968   Great Britain......................43,640/68

[52] U.S. Cl. ..................340/15.5 CC, 340/7 R, 235/181, 307/233, 340/15.5 DP, 340/15.5 TC
[51] Int. Cl. .........................................................G01v 1/28
[58] Field of Search..............340/15.5 R, 15.5 RC, 15.5 DB, 340/7; 235/181; 307/233

[56] References Cited

UNITED STATES PATENTS

| | | | |
|---|---|---|---|
| 2,874,795 | 2/1959 | Doty et al. | 181/.5 |
| 3,018,962 | 1/1962 | Jones et al. | 235/181 |
| 3,292,141 | 12/1966 | Hines et al. | 340/7 |
| 3,303,335 | 2/1967 | Pryor | 235/181 |
| 3,409,870 | 11/1968 | Mounce et al. | 340/15.5 |
| 3,413,596 | 11/1968 | Backus et al. | 340/7 |
| 3,465,286 | 9/1969 | Stone | 340/15.5 |

Primary Examiner—Benjamin A. Borchelt
Assistant Examiner—N. Moskowitz
Attorney—Pierce, Scheffler & Parker

[57] ABSTRACT

A method of seismic prospecting involves making seismic records utilizing a seismic source in substantially continuous operation and motion, and in which a first signal representative of the time-variant and space-variant waveform radiated from the moving seismic source is derived directly therefrom, while a second signal is derived indirectly therefrom via a detector array, and after filtering these signals if necessary the first signal is divided into segments which are each cross-correlated and matched with their counterpart(s) in a segment of the second signal having the same starting time as the first-signal segment but a duration extended beyond that of the first-signal segment by a period representing the maximum seismic travel time of interest, the time-shift between the first-signal segment and its counterpart(s) in the second-signal segment being detected and recorded. Apparatus for performing this method of seismic prospecting is also provided, which consists essentially of a continuous seismic source, a transducer responsive directly to that source, a detector array, communication linkages and a recording station.

11 Claims, 9 Drawing Figures

Patented July 11, 1972 3,676,841

Inventor
Nigel Allister Anstey

By
Pierce, Schiffler & Parker
Attorneys

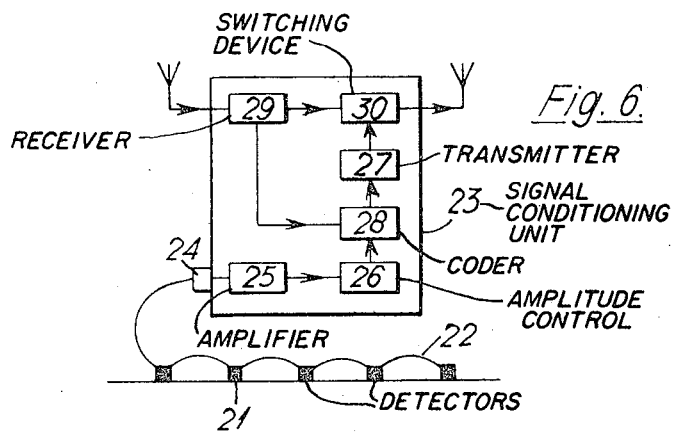
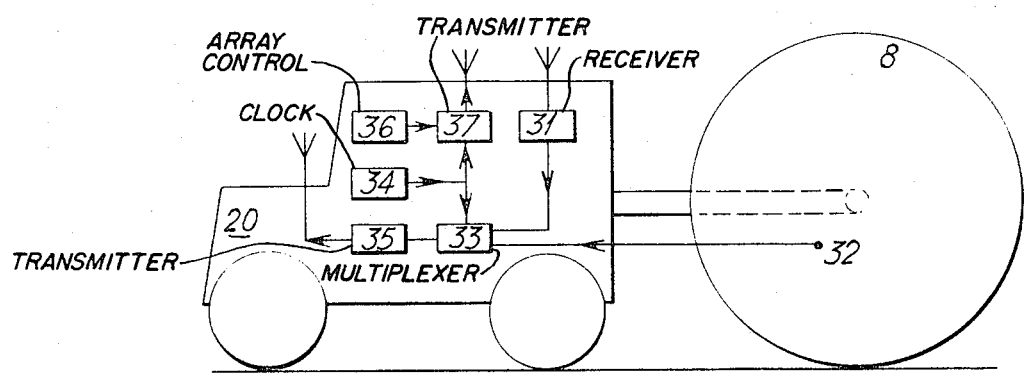
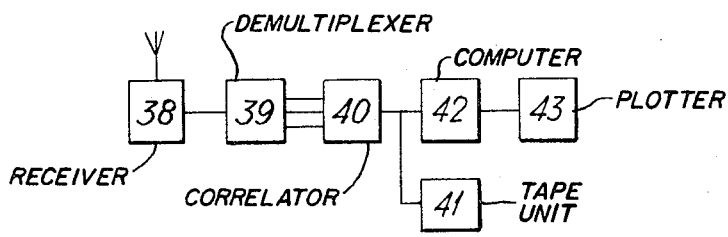
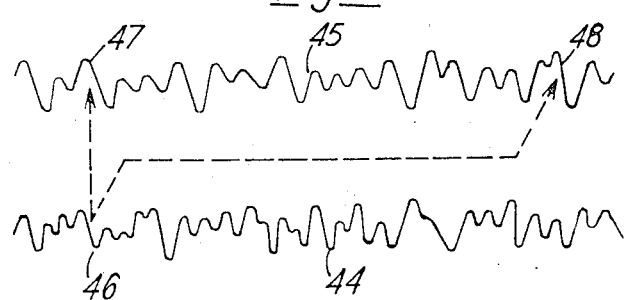

Patented July 11, 1972

Inventor
Nigel Allister Anstey

By Pim, Schiffler & Parker
Attorneys

SEISMIC PROSPECTING WITH A CONTINUOUS SEISMIC SOURCE

CROSS-REFERENCE TO RELATED APPLICATION

This invention is concerned with improvements in the art of seismic prospecting, and in particular with a method of making seismic records utilizing a seismic source, in substantially continuous operation and motion, such as that described and claimed in my copending application for U.S. Pat. No. 857,122 entitled "Continuous Seismic Source," of even date herewith, now U.S. Pat. No. 3,583,521 granted June 8, 1971.

BACKGROUND OF THE INVENTION

1. Field of the Invention

Seismic prospecting, in common with other echo-ranging methods, makes much use of source and detector arrays. Such arrays are variously useful in discriminating against arrivals from undesired directions, in improving the coupling between the transducers and the medium, and in enhancing the desired reflection signal relative to ambient noise. Detector arrays are normally established with a plurality of individual detectors distributed over the array dimension and connected to produce a single composite output. Source arrays are conveniently established in two ways, dependent on the type of source. With traditional explosive sources, the normal technique is to arrange a spaced pattern of individual explosive charges and to detonate them simultaneously. With mechanical sources, the normal technique is to take a plurality of individual seismic records, each with the source in a new stationary position, and to composite these records; nominally the resulting composite record is then similar to that which would have been obtained if each source position had been occupied by a source and all sources had been operated simultaneously.

2. Description of the Prior Art

In the prior art the effective dimensions and arrangement of both source and detector arrays are decided in advance; further, the dimensions remain unchanged for different source-to-detector distances and for different seismic travel-times. Since the dimensions are often decided largely on the basis of suppression of the surface waves, since the surface waves have a definite time-distance relation, and since the dimensions required for suppression of the surface waves are usually larger than would otherwise be desirable, it follows that the technique of the prior art is not optimum. The disadvantage of the invariant arrays of the prior technique is very clearly seen on the first (or refracted) arrivals, which are often rendered unusable, and on shallow reflections, whose resolution is often seriously impaired.

Also decided in advance, in the prior art, is the distance between adjacent array centers. In effect, this determines the horizontal resolution of which the seismic method is capable; large spacings are economical, but they may cause the method to misinterpret small geological features, or to lose continuity. Like the array dimensions, the array spacing should properly be a function of travel-time; the horizontal resolution is linked to the reflector area illuminated within a pulse period, and this, in practice, increases with reflector depth. This means that the array spacings should ideally be sufficiently small to be compatible with the best horizontal resolution allowed on the shallowest reflections by their pulse spectra. In conventional terms, the final seismic section should contain a great number of traces, but adjacent traces should be constrained to be more and more similar as travel-time increases.

The implementation of a source array using explosive charges requires many drilled holes to receive the explosive, and is consequently slow and expensive. The realization of a source array using established mechanical sources also tends to be slow and expensive, because of the need to implement repeatedly the cycle of stopping, preparing, energizing, recovering, and moving the source. This may be illustrated by reference to a common-depth-point operation utilizing a conventional weight-dropping source, as described by Shock in *Geophysics*, vol. 28, p. 831. In such operations it is commonplace to use 10 or 20 weight-drops over a source array length of 330 ft. and to composite these drops into a single reflection observation made at 24 detector arrays; then the repetition of the source array at a spacing corresponding to that of the detector arrays yields 12-fold common-depth-point coverage, as is well known in the art. The time necessary to complete a unit profile of 1½ miles is typically 48 minutes with 10 drops per source array, or 80 minutes with 20 drops per source array. The maximum coverage in 8 hours of recording time is therefore 15 miles or 9 miles, respectively, and difficulties associated with the laying of cables and the planting of geophones usually reduce these figures considerably.

When the seismic source is of such form that the injection of the necessary seismic energy into the earth takes a long time or represents a large expense, it makes good sense to detect the resulting reflections in as many places as possible. Therefore the use of 24 detector arrays is traditional, and higher numbers are becoming common. This also contributes expense, and so a balance is sought between source cost and instrumental cost. It follows that any development which allows the same source energy to be injected in a shorter time or at less cost also changes the optimum configuration of the detecting and recording apparatus; in particular, it may reduce the optimum number of channels, and so allow instrumental practices which are scarcely feasible with the present multiplicity.

The aforesaid application describes a seismic source which is in continuous motion along the ground, and which is capable of injecting into the earth in 16 minutes, along a profile of 1½ miles, the equivalent of 10 conventional weight-drops over each 330 ft. By inexpensive duplication of the source, the same speed may be maintained for conditions requiring the equivalent of 20 conventional weight-drops over each 330 ft. In essence, this source utilizes a random shower of falling weights, whose total weight and dropping height are less (and hence more practical) than those of the conventional weight-drop apparatus, but which achieves equal energy output in less time by cycling the weights at high speed inside a rolling drum.

This novel source, therefore, allows well-established field techniques to be operated at higher speed than with prior sources. Alternatively, it allows instrumental changes which simplify the recording and processing of the data. In both cases, the continuously moving nature of the source allows a novel approach to the choice of array dimensions and array spacing.

OBJECTS OF THE INVENTION

Accordingly it is an object of the present invention to provide a method of making seismic records using continuous seismic sources in continuous motion, and in particular the source of the aforesaid application.

It is a further object to provide a method of making seismic records by which improved operating speeds are possible.

It is a further object to provide a method of making seismic records, in which the transmission of the observed data by radio links is facilitated.

It is a further object to provide a method of making seismic records, which method makes practical the removal of the seismic recording equipment from the field to the base office.

It is a further object to provide a method of making seismic records, which method makes practical the transmission of the observed data directly into a computer, without an intermediate recording stage.

It is a further object to provide a method of making seismic records, in which the usual instrumental difficulties of dynamic range and gain control are reduced or avoided.

It is a further object to provide a method of making seismic records, in which the horizontal resolution represented by the array spacing is not decided in advance of the seismic observations.

It is a further object to provide a method of making seismic records, in which the source array dimensions are not decided in advance of the seismic observations.

It is a further object to provide a method of making seismic records, in which the source array dimensions may be made effectively time-variant with the seismic travel time.

It is a further object to provide a method of making seismic records, in which considerations of differential slant-path corrections (or "normal moveout" corrections) no longer figure among the factors limiting the selection of source array dimensions.

SUMMARY OF THE INVENTION

In essence, the invention constitutes a method of making seismic records utilizing a continuous seismic source in continuous movement, and involving the following steps:

a. The derivation of a first signal from the moving source, which first signal represents the time-variant and space-variant waveform radiated from the source.

b. The derivation of a second signal from the output of a detector array.

c. The application of any desired filtering to either or both of said signals.

d. The division of first said signal into first segments whose duration represents a desired horizontal resolution at the speed of travel of the source.

e. The cross-correlation of each such first segment against a segment of the second signal having the same starting time as the said first segment but a duration exceeding that of the first segment by a time representing the maximum seismic travel-time of interest.

The method may involve also the step of changing the duration of said first segment (and that of the corresponding segment of the second signal accordingly) in order to provide a source array dimension which is a function of the said travel-time.

BRIEF DESCRIPTION OF THE DRAWINGS

The invention is illustrated by the attached drawings, in which:

FIG. 6 shows the instrumental elements used in a land operation, and illustrates the use of radio links.

FIG. 7 illustrates a representative length of the two signals used in the cross-correlation process, and the significance of seismic travel time on these signals.

DESCRIPTION OF THE PREFERRED EMBODIMENTS

Figure 1:
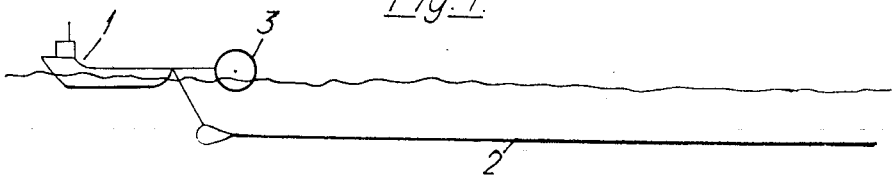
FIG. 1 shows a continuous seismic source used with a conventional detector assembly at sea.

In FIG. 1, a survey ship 1 tows a conventional streamer cable 2, which may have 24 or more detector arrays distributed along its length. The continuous seismic source is shown generally at 3; it may be towed behind the ship, or supported from the ship itself. As described in the aforesaid application, the source incorporates a transducer from which is derived a signal representing the output of the source. The technique of FIG. 1 is a minimum modification of the prior art in marine prospecting, in which the modifications are merely those to accommodate the continuous source. With 24 detector arrays in the streamer cable, the technique yields 12-fold cover. Since in this field technique (alone of those to be described) the source does not move relative to the detector arrays, no source array is provided; therefore the value of the present invention in permitting a flexible choice of source array dimensions is not realized. The manner in which the derived seismic signals are utilized to obtain a flexible choice of horizontal resolution is described for this and the following field techniques later in this specification.

Figure 2:
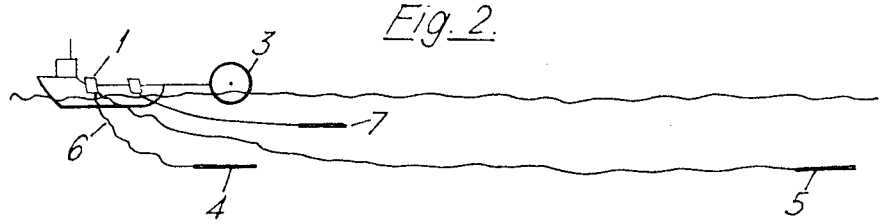
FIG. 2 shows a continuous seismic source used with a novel detector arrangement involving only one or two detectors in operation at any time.

FIG. 2 also shows a survey ship 1 and a continuous seismic source 3, but the multi-element streamer cable of FIG. 1 is replaced by individual detector arrays such as the two illustrated at 4 and 5. In operation, the detector array 4 is streamed overboard with a wire connection 6 to the ship; the wire 6 is paid out at a rate at least as great as the speed of the ship, so that the detector array 4 remains stationary in the water. The seismic output of the array is accepted for recording or other manipulation (as hereinafter described) soon after the source 3 has passed over it, and continues to be so accepted until the distance between the source 3 and the detector has increased to the desired limit of spread length. At this time the detector is in the position illustrated generally at 5. Just before half-way through this recording period a second detector array is streamed from the ship, conveniently from the other side, so that by the time the recording of the first detector array is half complete that of the second detector array can commence. Both arrays are recorded for the remaining half of the recording cycle. By the end of the cycle a third detector array (not shown) has been streamed from the ship and is in position to commence recording. Thereafter the detector array 5 is recovered to the ship by pulling on its connecting wire; diverter fins, hydrofoils or pneumatic control of buoyancy may be used to ensure that this detector array does not foul the forward arrays or the source as it is recovered. The recovery need proceed only to a position slightly forward of the position at which the use of its seismic output recommences. Each of the three detector arrays thus goes through a cycle comprising a stationary or drifting stage and a recovery stage; the outputs of the two arrays in the stationary or drifting stage are accepted for recording or other manipulation, while the output of the array in the recovery stage is not used.

This arrangement yields single-cover seismic profiles. The method of adapting the technique for multiple coverage will become apparent from the discussion of FIG. 3, 4 and 5. The use of detector arrays which are drifting in the water has a considerable advantage over the use of towed arrays, in that the tow noise is substantially eliminated. The technique is also of particular utility in shallow water; the source 3 needs very little draught, and the arrays 4 and 5 may be given a weight in water such that they just sink to the bottom.

An alternative technique uses a single towed array, as suggested at 7, in the manner of a continuous profiler, but provides a single drifting array such as 4 or 5 for the recording of an occasional spread profile; the latter is then useful in determining the velocities to (and hence the depths of) the reflections shown by the towed array.

Figure 3:
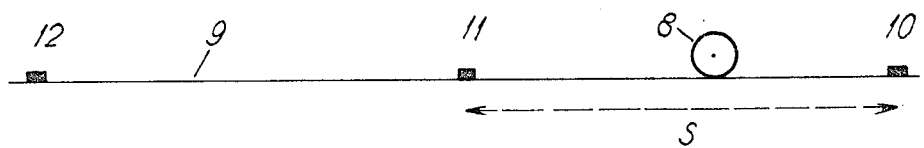
FIG. 3 shows a continuous seismic source used to obtain single-cover seismic profiles on land.

FIG. 3 illustrates a preferred manner of obtaining single-cover seismic profiles on land. The continuous source, suitably configured as described in the aforesaid Application, is shown generally at 8, rolling in a counter-clockwise direction from right to left along the line of profile 9. Detector arrays typified by 10, 11 and 12 are spaced apart at the desired spread length s: in conformity with the earlier examples, this may be given a representative value of 1½ miles.

The operation commences with the laying of arrays 10 and 11, conveniently from a small truck which then proceeds to lay array 12. As the detector-laying truck reaches the location of array 12, the source 8 commences to roll past array 10 on its continuous way along the line of profile. While the source is between arrays 10 and 11 the outputs from these two arrays are accepted for recording or other manipulation. By the time the source 8 reaches the array 11 the array 12 has been laid; then while the source rolls on between arrays 11 and 12 the detector is laying the next array, and the outputs from arrays 11 and 12 are accepted for recording or other manipulation. The process repeats continuously in this manner, with the detector-laying truck keeping a safe distance ahead of the source, and with the source radiating and moving continuously.

As mentioned hereinbefore, the source of the aforesaid application, in a suitable embodiment, can radiate energy equivalent to that of 10 conventional weight-drops over 330 ft; further, it can do this while in continuous motion at 8 ft/s or 5.5 mile/h. It follows that seismic conditions which are satisfied by such an injection of energy into the earth allow the single-fold coverage of FIG. 3 to be obtained at this rate. An 8-hour recording day thus allows 44 miles of continuous single-cover profile to be obtained. Detector arrays are spaced 1½ miles apart, and each must be laid in a time not exceeding 16 minutes; this is entirely feasible. If no attempt is made to recover and re-lay the completed arrays behind the source, a day's work requires a total of 31 arrays; the number can be reduced to a few if a detector-recovery truck works behind the source.

Figure 4:
FIG. 4 shows a continuous seismic source used in one manner of obtaining three-fold seismic profiles on land.

FIG. 4 illustrates how the provision of three detector arrays in each length $s$ allows three-fold coverage at the same speed. For example, when the source is between arrays 14 and 11 the outputs of arrays 10, 13, 14, 11, 15 and 16 are accepted for recording or other manipulation; as the source passes array 11 the signal from array 10 is switched off and that from array 12 is accepted. Since this technique requires a three-fold increase in the number of detector arrays, there is increased merit in having a detector-recovery truck working behind the source, bringing the recovered detectors to the detector-laying truck at convenient occasions.

Alternatively, the number of data channels may be reduced to the former number of two, at the expense of making three source passes along the line. Since this yields a daily production of 15 miles, still exceeding that usually obtained with the prior art, it may be the preferred course in some circumstances. The first pass up the 15-mile line, from right to left, occurs exactly as described in connection with FIG. 3; this requires a total of 11 detector arrays, of which only two are in use at any time. After the traverse of the line, the last detector array is relaid a distance of two-thirds of $s$ back from the end (for example, if array 12 represented the end of the line, this array would be moved back to the position marked 15 in FIG. 4). The detector-laying truck then continues back along the line, moving each array the same distance, and the source moves behind it in the same manner as on the first pass. At the original end of the line the first array is then moved a distance of one-third of $s$ in the direction of the first pass (to the left, in FIG. 4), and the same operation continues for the third pass. In this way three-fold coverage is built up in three separate passes, with a total of 11 arrays, no detector-recovery truck, the need for two detector data channels only, and, for the typical distances quoted, on overall survey rate of nearly 2 miles per hour.

Figure 5:
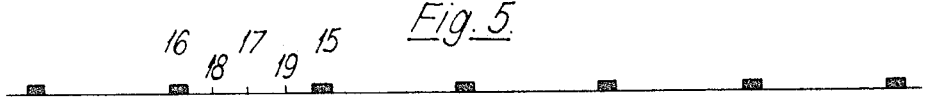
FIG. 5 shows a continuous seismic source used in one manner of obtaining 12-fold seismic profiles on land.

FIG. 5 represents the extension of this approach to 12-fold coverage. In principle, of course, it would be possible to provide 24 detecting arrays in simultaneous use, and so to realize 12-fold coverage in a single pass, at a steady speed of 5.5 mile/h; the operation would then be akin to the marine case of FIG. 1. On land, however, it is difficult to lay detector arrays at this speed, and the conventional type of recording with a recording truck and cables would not be well adapted to continuous source movement. Accordingly, a preferred mode of operation is that involving several passes and fewer detector arrays; the use of six arrays then requires four passes, while the restriction to four arrays requires six passes. In the case of six arrays and four passes, the arrays are spaced at intervals of one-third of $s$, as detailed in the first part of the description of FIG. 4 above. In the four passes, then, each of these arrays occupies four positions, spaced apart at one-twelfth of $s$; if in the first pass the array positions of FIG. 4 are used, as in FIG. 5, then before the second pass (left to right) the exemplary array 16 is moved to position 17, before the third pass (right to left) to position 18, and before the fourth pass (left to right) to position 19. For a production of 11 miles a day, the four-pass technique requires a total of 23 detector arrays, of which only six are connected to data channels at any time.

It will be appreciated that the examples given in the discussion of FIGS. 3, 4 and 5 are for illustration only, and that the choice of the number of data channels and the number of passes, for a given fold of coverage, may be selected according to the circumstances without departing from the scope of the invention.

A preferred form of apparatus for use in the practice of this invention is illustrated in FIG. 6. In the figure the source 8 is towed by the vehicle 20. Conventional detectors or geophones 21 are disposed in an array and interconnected by means of conventional wires 22. The output from the array enters the signal-conditioning unit 23 through plug-and-socket connection 24. Therein the signal is amplified by conventional amplifier 25 (which may include suitable anti-aliasing or other filtering if desired), and subjected to amplitude control in unit 26. The special requirements of this unit are discussed later in the specification. The signal then passes to the radio transmitter 27, preferably through a coding or modulation device represented generally at 28; in particular, it is preferred that this device be a digitizer, wherein the signal is converted to binary form. Meanwhile a radio signal from the tow vehicle is being received at the receiver 29; this signal provides a clock control for the coder or digitizer 28 and also allows the switching on and switching off of the transmitter 27 by switch means illustrated generally at 30.

Each of the arrays in use is provided with a signal-conditioning unit 23. The requirements for radio frequencies may be minimized by the use of selective modulation systems in both the signal radio links and the control radio link, as is well known in the art. The signals transmitted from the several arrays are received in the tow vehicle by receiver 31, as are the signals received from one or more source transducers such as that indicated generally at 32. The latter signals may also be subjected to anti-aliasing or other filtering if desired, and digitized in the manner of the array signals. These several signals are then multiplexed in the multiplexer 33, under the control of clock generator 34, and sent to the radio transmitter 35; this transmitter is capable of transmission ranges such as those encountered between seismic field operations and the base office. The output of the clock generator 34 is also transmitted to the array conditioning units, as are switch control signals from the array control unit 36, by the transmitter 37.

The signal radiated by the large transmitter 35 represents a multiplexed version of the array signals, together with a source signal obtained from the transducer 32. If a plurality of sources are used, one tow vehicle incorporates the equipment described above, and the others have merely a transmit-receive unit similar to those used at the arrays; from the several source signals is formed one composite source signal, which then enters the multiplexer 33 as before. For operation using two arrays, therefore, there are three signals multiplexed into the output of the transmitter 35; for operation with six arrays there are seven signals so multiplexed. A synchronizing signal may also be included.

These signals are received at the base office by receiver 38, demultiplexed in the demultiplexer 39, and applied to the correlator 40. The demultiplexer 39 may actually form an integral part of correlator 40. The correlator 40 multiplies each sample of the source signal by the corresponding sample of each array signal and by each of the following samples of each array signal, up to a limit incorporated in the device and representing the maximum seismic travel-time of interest. It may also sum these products in a manner to be discussed later in this specification.

At this stage, the output from the correlator 40 may conveniently be recorded on magnetic tape by the tape unit 41. In some installations, it is desirable to effect further processing in the base office, before sending the data for final processing elsewhere; this processing may be done in computer 42, and the resulting seismic records may be displayed on plotter 43, in the manner well known in the art.

The components used in the signal-handling apparatus as described are all, individually, of well-known type, and individual units may be replaced by others of similar function without affecting the novelty of their combined use for the practice of this invention.

The operation of the correlator 40 is illustrated in FIG. 7. In this figure, signal 44 is that obtained from the source, and signal 45 is that obtained from a representative array. The signal 44 is ordinarily continuous throughout the whole of the working day. The signal 45 is continuous over a duration corresponding to the spread length $s$ at the speed of movement of the source; this is typically 16 minutes. The basic operation performed by the correlator 41 is the multiplication of each ordinate or sample value of the source signal 44 (such as the value indicated at 46) by each of the ordinate or sample values of the array signal 45 over a time range (such as that from 47 to 48) representing the maximum travel-time of interest. In a typical case in which this latter time is 6 seconds and sample values are measured every 4 ms, the correlator therefore produces 1,500 products for each sample of the source signal 44.

A sample value of the source signal 44, for a moving seismic source, represents not only an instant of time but a particular source position. For the same sample interval of 4 ms and a source speed of 8 ft/s, the horizontal axis of a seismic record obtained with a moving source is therefore divided into units of 0.032 ft on the surface, or of 0.016 ft on the sub-surface.

Figure 8:
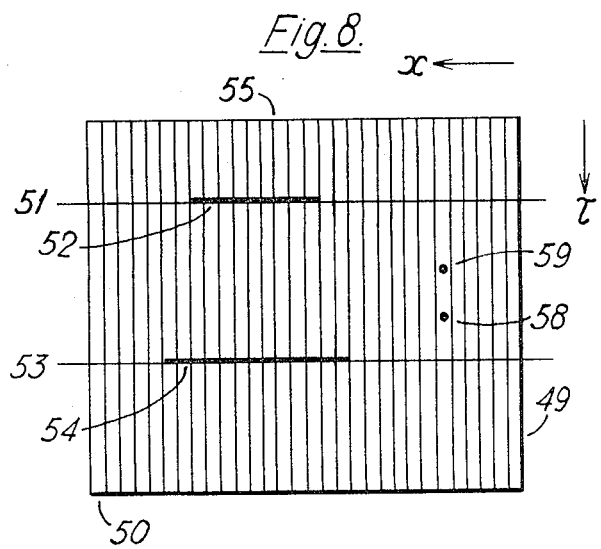
FIG. 8 shows how the results of the cross-correlation process may be displayed in the form of a seismic record, and how arrays of time-variant length may be achieved by horizontal addition.

FIG. 8 illustrates the construction of a seismic record 49 with this extreme horizontal resolution. Each vertical strip 50 represents the succession of product values obtained from the correlator 41 for one sample value of the source signal 44; in the usual manner, this allows the seismic travel to be represented vertically, with the origin (the product of corresponding sample values 46 and 47) at the top. The product of sample values 46 and 48 is therefore at the bottom, representing the limit of desired travel time. In conventional terms, the record 49 is comprised of a very large number of traces (in the illustration, about 2½ million), instead of the traditional 24.

The provision of a source array, in FIG. 8, is effected by making a horizontal summation of product values. For example, at the travel time indicated by 51 it may be desired to provide a source array length equivalent to nine of the strips 50; the values to be summed are indicated by the heavy line 52 in the figure. At a later travel time indicated by 53 the desired source array may be equivalent to thirteen strips; the values to be summed are indicated at 54, for the same surface point 55. It will be apparent to those skilled in the art that this process is evaluating the cross-correlation function between signals 44 and 45 over an integration interval which is itself time-variant; the merit of the approach of FIG. 8 is that it shows that no repeated multiplications are necessary.

From the last paragraph, it follows that a new trace may be constructed to correspond to the surface point 55, which new trace may represent any desired source array centered on that point, with any desired variation of that source array with travel time. For example, the source array may be short at travel times corresponding to the first arrivals, and it may be very long in the local areas of the record (both distance-dependent and time-dependent) which are dominated by surface waves.

In practice, clearly, it may be desirable to effect the source array addition by making a running sum along horizontal lines such as 51 and 53. In practice, also, one of the factors affecting the choice of source array dimensions becomes the aforesaid enhancement of the desired seismic signal relative to the ambient noise; this implies a tendency for the source array to be long at late travel times, so that the resulting pulse-compression ratio represented by the cross-correlation process may be large. The limit on the source array dimensions, as hereinbefore discussed, is set by the usual considerations of dip, differential travel-time between paths emanating from the two ends of the array, and horizontal resolution; these always allow source array dimensions which increase with travel time.

Figure 9:
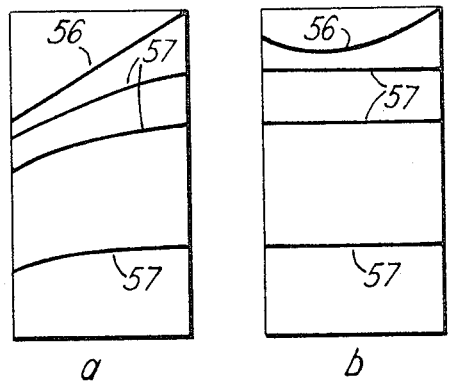
FIG. 9 illustrates diagrammatically a seismic record obtained by the method of the invention, (a) without normal-move-out corrections, (b) with normal-move-out corrections.

The method of realizing the source array by making a running sum horizontally across the matrix of FIG. 8 yields a horizontal, rather than vertical, construction of the seismic record. In the diagrammatic representation of a record in FIG. 9a, for example, the first breaks 56 and the prominent reflections 57 are not displayed in the usual fashion by segmentary traces, but are virtually continuous lines.

It follows that, up to this stage, no decision to limit the horizontal resolution has been made, except that implicit in the choice of array dimensions. Apart from this latter consideration, the nominal horizontal resolution remains at 0.016 ft. However, there is no real benefit in this; the pulse spectra encountered in practice do not warrant any attempt to maintain this horizontal resolution. Further, the need to store the enormous matrix of values represented by FIG. 8 is an embarrassment with present memory systems. Therefore the usual practice must be to adopt a coarser horizontal scale — to form an equivalent of FIG. 8 in which the strips 50 are composed of values each of which represented the horizontal sum of a large number of the previous such strips. For example, each new strip may be formed of 1,720 previous strips, thus reducing the storage requirement by this factor. Each new strip then represents a subsurface horizontal resolution of 27.5 ft. in the standard example. In conventional terms, the seismic record is now composed of 144 traces. Running sums of these new strips may then be formed, as before, to yield any desired source array dimensions in steps of 27.5 ft. on the subsurface, or 55 ft on the surface. The choice of 27.5 ft is tantamount to a selection of 6.88 s as the minimum integration interval for the cross-correlation between signals 44 and 45 in FIG. 7. The selection of a source array dimension of 550 ft for late travel times (obtained by making a horizontal sum of 10 strips) is tantamount to an integration interval of 68.8 s.

It must be understood that the foregoing numbers are provided by way of example, and in no sense limit the scope of the invention.

The next step after construction of the basic seismic record is usually the application of normal-move-out corrections, which compensate the differences of path lengths introduced when the seismic travel paths are oblique. This is conventionally done by transferring every sample (such as 58) in the matrix of FIG. 8 to a new address (such as 59) such that the sample occurs earlier in travel time by an amount equal to the appropriate normal-move-out correction. If this is done, and a new matrix constructed, the operation of forming the horizontal running sum may again be performed, to yield the corrected seismic record shown in diagrammatic form in FIG. 9b. The normal-move-out correction process removes the hyperbolic curvature of the reflections, as is well known in the art. There is, however, a novel feature of the described manner of constructing the seismic record, in that it removes one of the previous constraints on permissible source array dimensions. This is the limit, mentioned hereinbefore, of the differential travel-time between paths emanating from the two ends of the array; even if the normal-move-out corrections applied are only approximately appropriate, this limitation on source array dimensions is effectively removed. The effect of this is to allow better rejection of the surface waves, by the source array, than has been feasible in the prior art.

In the example quoted above, the choice of 55 ft as the minimum source-array dimension was made on the basis of storage requirements, and to be a reasonable unit in the synthesis of larger array dimensions. It follows that, in this case, the dimension of 55 ft may be the highest common factor of the larger array dimensions.

In general, the dominant component in the output of the detector arrays is that due to the surface waves, though at the larger source-detector distances it may be the ambient seismic noise. The component due to shallow reflections may be near or below this level, while that due to deep reflections is well below it. The reflections are raised above the surface waves and the ambient noise, of course, by the combined effect of the correlation integration interval and the moving source. Instrument noise should be maintained well below the ambient noise. Accordingly the dominent signal from the arrays should be maintained near full-scale on the instrumental system, provided that any distortions of relative amplitudes introduced are not significant.

A case adopted as typical is that in which the line traversed by the source is offset laterally by at least 100 ft from that joining the arrays; then the maximum distance from source to detectors, in the standard example, is nearly 8,000 ft, and the minimum is 100 ft. On an assumption of circular spreading, this represents a dynamic range of 18 dB for the surface waves. Further, the maximum rate-of-change of surface-wave amplitude, again for the standard example, can be shown to be about 0.2 dB/s.

These considerations dictate the requirements for the gain-control device 26 discussed in the description of FIG. 6. One approach is to maintain fixed gain, setting to full-scale of the digitizer 28 the array output obtained when the source is at its closest to the array. A second approach accepts that under these conditions, with the source very close to the array, it may not be desirable to use the resulting signal in the preparation of multi-fold profiles; the array signal may therefore be allowed to exceed full scale under these limited conditions. A third approach provides an automatic gain control at 26 in FIG. 6, with a total control range of about 20 dB, and compromise attack and release rates of 0.1 dB/s. Automatic gain control systems, although well established in the art, are no longer in favour; in conventional explosive and weight-dropping work the attack and release rates imposed by the fast-changing nature of the signal introduce harmful harmonic distortion, while in pulse-compression work using bursts of swept-frequency source signal the use of an automatic gain control introduces some spectral imbalance. Neither of these considerations is significant in the present invention.

In the prior art of seismic work utilizing the pulse-compression principle, it has been desirable to maintain full numerical significance in performing the necessary correlation. This is because of the dynamic range between the profusion of reflectors encountered, and the corresponding need to minimize the side-lobes of the correlation function by which each reflection is represented. In the present invention these side-lobes may be kept insignificant by the use of very long integration intervals (typically of the order of 1 minute). With such intervals, it becomes feasible to dispense with full numerical significance in the correlation process. In particular, the correlation mentioned in the course of this specification should be taken to include polarity-coincidence correlation, using only the sign of one or both signals participating in the correlation.

Although this invention has been described by reference to particular types of seismic field work, it is to be understood that the details of the operation and of the instrumentation may be varied without departing from the spirit and scope of the invention. In particular, amphibian operations, straddle-spread operations and operations utilizing conventional recording techniques in the field are all encompassed within the invention.

I claim:

1. A method of making seismic records utilizing a seismic source radiating impulses in a randomly-timed sequence, in substantially continuous operation and in substantially continuous motion in contact with ground or water, which comprises the following steps:

a. deriving a first signal directly from said moving seismic source, which first signal represents the time-variant and space-variant waveform radiated from said moving seismic source;

b. deriving a second signal indirectly from said moving seismic source via the output of at least one seismic detector array;

c. applying any requisite filtering to said first and second signals;

d. dividing said first signal into first-signal segments each having a duration representing a desired horizontal resolution at the speed of movement of said moving source;

e. cross-correlating each such first-signal segment against a segment of said second signal having the same starting time as the related first-signal segment but a duration exceeding that of the related first-signal segment by a period representing the maximum seismic travel-time of interest, and thus matching each such first-signal segment with its counterpart(s) in said second-signal segment and detecting the relative time shaft therebetween representative of the seismic travel time; and f. preserving the results of said cross-correlating step.

2. The method as defined in claim 1 wherein the step of preserving the results of said cross-correlating step includes recording and display thereof as a function of the detected time-shift in the form of a seismic record.

3. A method of making seismic records utilizing a seismic source radiating impulses in a randomly-timed sequence, in substantially continuous operation and in substantially continuous motion in contact with ground or water, which comprises the following steps:

a. deriving a first signal directly from said moving seismic source, which first signal represents the time-variant and space-variant waveform radiated from said moving seismic source;

b. deriving a second signal indirectly from said moving seismic source via the output of at least one seismic detector array;

c. applying any requisite filtering to said first and second signals;

d. selecting from said first signal segments each having a duration representing or related to a first desired source array dimension at the speed of movement of said moving seismic source;

e. cross-correlating each such first-signal segment against a segment of said second signal having the same starting time as the related first-signal segment but a duration exceeding that of the related first-signal segment by a period representing the seismic travel-time over which the said first source array dimension is desired, and thus matching each such first-signal segment with its counterpart(s) in said second-signal segment and detecting the relative time shift there-between representative of the seismic travel time;

f. selecting from said first signal modified first-signal segments each having a duration representing or related to a second desired source array dimension at the speed of movement of said moving source;

g. cross-correlating each such modified first-signal segment against a segment of said second signal having a starting time later than the starting time of said first-signal segment by the travel time over which said first source array dimension is desired and a duration exceeding that of the modified first-signal segment by a period representing the seismic travel-time over which the said second desired source array dimension is desired;

h. continuing the sequence represented by steps (f) and (g) to provide further time-variant source array dimensions as desired; and i. preserving the results of said cross-correlating step.

4. The method as defined in claim 3 wherein the step of preserving the results of said cross-correlating step includes recording and display thereof as a function of the detected time-shift in the form of a seismic record.

5. A method of making seismic records utilizing a seismic source in substantially continuous operation and in substantially continuous motion in contact with ground or water, which comprises the following steps:

a. deriving a first signal directly from said moving seismic source, which first signal represents the time-variant and space-variant waveform radiated from said moving seismic source;

b. deriving a second signal indirectly from said moving seismic source via the output of at least one seismic detector array;

c. applying any requisite filtering to said first and second signals;

d. selecting from said first signal segments each having a duration representing or related to a first desired source array dimension at the speed of movement of said moving seismic source;

e. cross-correlating each such first-signal segment against a segment of said second signal having the same starting time as the related first-signal segment but a duration exceeding that of the related first-signal segment by a period representing the seismic travel-time over which the said first source array dimension is desired, and thus matching each such first-signal segment with its counterpart(s) in said second-signal segment and detecting the relative time shift therebetween representative of the seismic travel time;

f. selecting from said first signal modified first-signal segments each having a duration representing or related to a second desired source array dimension at the speed of movement of said moving source;

g. cross-correlating each such modified first-signal against a segment of said second signal having a starting time later than the starting time of said first-signal segment by the travel time over which said first source array dimension is desired and a duration exceeding that of the modified first signal segment by a period representing the seismic travel-time over which the said second desired source array dimension is desired;

h. continuing the sequence represented by steps (f) and (g) to provide further time-variant source array dimensions as desired; and i. preserving the results of said cross-correlating step.

6. The method as defined in claim 5 wherein the step of preserving the results of said cross-correlating step includes recording and display thereof as a function of the detected time-shift in the form of a seismic record.

7. Apparatus for making seismic records, which consists essentially of the following operatively-interconnected integers in combination:

a. At least one seismic source adapted to the continuous generation of seismic impulses in a randomly-timed sequence while in substantially continuous motion horizontally in contact with ground or water;

b. At least one transducer responsive directly to said seismic source and transmitting when in operation a first signal representative of the seismic output of said source;

c. At least one seismic detector array responsive indirectly to said seismic source and transmitting when in operation a second signal representative of the output of said array;

d. communications linkages interconnecting said transducer(s) and said detector array(s) with a receiving station; and e. means for segmenting and correlating said first and second signals to provide seismic traces having selectable horizontal resolution and/or selectable time-variant source array dimensions.

8. Apparatus according to claim 7 which also includes recording means for said first and second signals at said receiving station.

9. Apparatus according to claim 7, in which said correlating means is of polarity-coincidence type.

10. Apparatus according to claim 7, in which said communication linkages include a radio link.

11. Apparatus according to claim 7, in which said communication linkages operate in digital mode.

* * * * *